Aug. 17, 1965 G. L. CLARK ETAL 3,201,654

IMAGE CONVERTER CAMERA

Filed Dec. 26, 1961

GEORGE L. CLARK
J. P. SMITH
INVENTORS

BY [signature]
[signature]
AGENTS

United States Patent Office 3,201,654
Patented Aug. 17, 1965

3,201,654

IMAGE CONVERTER CAMERA

George L. Clark and J Perry Smith, Hawthorne, Calif., assignors, by mesne assignments, to Thompson Ramo Wooldridge Inc., Cleveland, Ohio, a corporation of Ohio Filed Dec. 26, 1961, Ser. No. 161,794
8 Claims. (Cl. 317—100)

This invention relates generally to an image converter camera and more particularly to the mechanical arrangement of the electronic circuits and the image converter tube.

In the design and development of a high-speed electronic camera it is necessary to utilize a plurality of interchangeable electronic chassis in order to achieve optimum use of the image converter tube. The camera operates in two basic modes that permit high-speed framing and streak photography. The streak photography mode is achieved by utilizing an electronic chassis capable of generating the necessary ramp voltage that is applied through suitable interconnecting jacks to the image converter tube. The writing rate is determined by the slope of the ramp voltage while the total writing time is controlled by the width of a rectangular shuttering pulse.

In the high-speed framing mode three frames are generated by applying voltage pulses to the deflection plates of the image converter tube in timed relationship with a substantially rectangular shuttering pulse. In operation the combination of a constant voltage deflection pulse and the accurately timed shuttering pulse provides a stationary image on the photo-anode of the image converter tube during the time required for each exposure.

The voltage waveforms required by the camera are generated in the individual electronic circuits, each contained in a separate chassis. These aforementioned chassis utilize a plurality of electronic discharge devices that each generate a substantal amount of heat energy. This heat energy must be dissipated, otherwise the temperature rise would affect the very critical matched components used to generate the timed pulses. The pulses generated by these circuits have permitted exposures to be made in less than three one-billionths of a second, which is known to be presently twice as fast as any previous picture obtained with any technique. The defined framing chassis provide timed pulses for generating independently adjustable intervals from 0.05 to 10 microseconds with exposure times that are adjustable from three to 200 millimicroseconds. The defined streak chassis generate pulses that provide writing times from 50 millimicroseconds to 10 microseconds. The individual circuits are independently described and claimed in the following copending patent applications:

| Docket No. | Title | Serial No. | Filing Date |
|---|---|---|---|
| 263 | Wave Shaping Electric Circuit. | 50,561 | August 19, 1960. |
| 329 | Wave Generating Circuit | 92,083 | February 27, 1961. |
| 370 | Trigger Circuit | 80,385 | January 3, 1961. |
| 388 | Pulse Forming Circuit | 104,464 | April 20, 1961. |
| 423 | Protective Circuit | 114,472 | June 2, 1961. |
| 559 | Linear Sweep Circuit | 132,928 | August 21, 1961. |

In order to communicate these defined pulses from the individual plug-in chassis to the image converter tube, it is necessary to place the chassis in a substantially close relationship with the defined image tube in order to reduce the delay caused by the interconnecting cables. Locating the electronic chassis above the image converter tube presented difficulties since it is physically impossible to service the unit with the plug-in chassis in place, and also, the heat generated by the electron discharged devices made the electron circuits and generated pulses violently unstable. In addition mechanical cooling devices were unsatisfactory due to the inherent vibration associated with these devices, and more important, the changing magnetic fields unduly influenced the image converter tube, making the camera inoperable.

It is therefore an object of this invention to describe a mechanical arrangement of an image converter tube and electronic chassis that achieves the desired result of maintaining a close relationship between the chassis and the image tube while at the same time providing access for servicing requirements, magnetically shielding the image tube and allowing normal convection cooling currents to circulate and cool the electronic chassis. These objects are achieved by locating the electronic chassis above the image converter tube and preferably in a symmetrical relationship thereto, thereby maintaining the interconnecting leads from the chassis to the image tube as short as possible. Each of the electronic chassis contains a pair of subchassis, each arranged to support a plurality of electron discharge devices in a horizontal plane over the image converter tube. Suitable openings in the chassis below the electron discharge tubes allow convection cooling currents to pass from under the chassis up to and around the electron discharge devices. A magnetic shielding material surrounds the image converter tube thereby effectively magnetically insulating the image tube. A cover having louvers on the lowermost portion and ventilating openings on the upper most portion, completely surrounds the magnetic shielding material and the chassis in a substantially close relationship thereby defining a passageway for circulating convection currents of air. These circulating currents of air flow from the louvers, through the openings in the chassis, around the electron discharge devices and out the ventilating openings to thereby cool the electron discharge devices. Since the electron discharge devices are horizontally supported the terminals of the electron discharge devices are accessible for the servicing and measuring of necessary voltages.

Further objects and advantages of this invention will be made more apparent by referring now to the accompanying drawings wherein.

Figures 1, 2, 3:
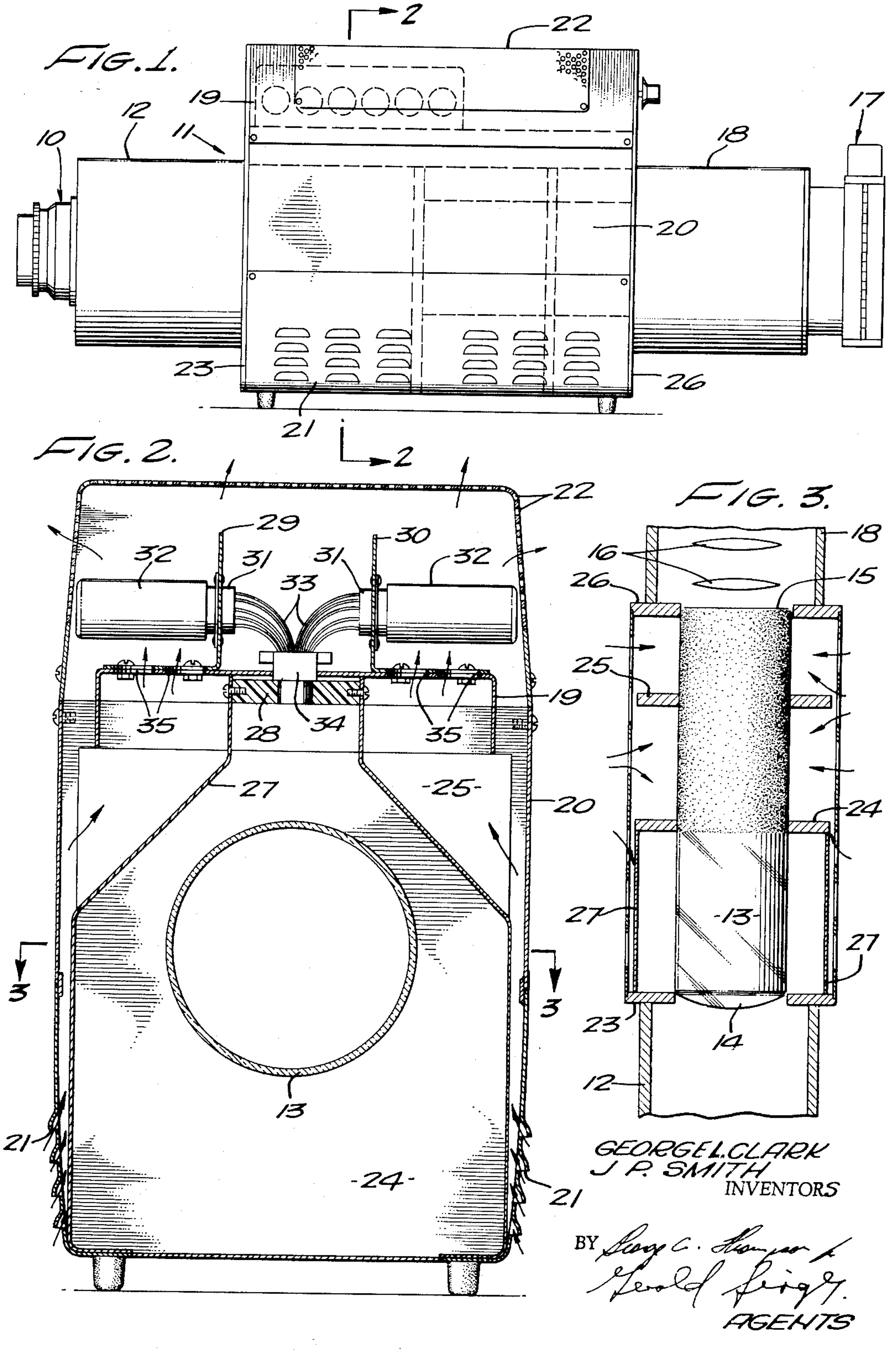
FIGURE 1 is a side elevation of an image converter camera.
FIGURE 2 is a vertical section taken along lines 2—2 of FIGURE 1.
FIGURE 3 is a horizontal section taken along lines 3—3 of FIGURE 2 illustrating more clearly how the ornamental cover and the shielding material for the image tube define the passageway for circulating the convection currents.

Referring now to FIGURE 1, there is shown the external configuration of an image converter camera comprising a lens portion 10 located at one end of an image tube located within a housing 11. A substantially circular member 12 is connected to one end of the housing 11 and provides the dual function of supporting the lens 10 and providing a path for the light image from the lens 10 to the enclosed image tube. The image tube 13 is more clearly shown in FIGURE 3 and comprises a photocathode 14 at one end facing the lens 10 and a photoanode 15 at the other end. In operation, light from the lens 10 is focused on the photo-cathode 14 which transforms the optical image into an electron image. By electronic means the electron image is focused on the photoanode 15 where it is reconverted to a higher intensity optical image. Rear collimating lenses 16 project the image formed on the photo-anode to a sensitized photographic film used to record the image. The photographic film is preferably used in conjunction with a standard camera 17 illustrated in FIGURE 1 as being mounted on a support member 18. Support member 18 is attached to the main camera body 11 and provides a substantially enclosed area for the projection of the image from the photo-anode 14 to the camera 17. The main body of the camera 11 contains the image converter tube 13 and a removable chassis assembly 19 located vertically above and symmetrically disposed with respect to said image converter tube. An external cover 20 substantially encloses the main camera portion 11 and includes louvers 21 on each side of said main camera portion 11. The uppermost portion of the cover 20 contains a plurality of openings 22 located substantially above the chassis member 19.

Referring now to FIGURE 2 there is shown a section taken along line 2—2 of FIGURE 1 which illustrates in more detail the relationship of the chassis member 19 to the image tube 13. The image tube 13 is supported by means of formed openings in a plurality of brackets 23, 24, 25, 26. These brackets are more easily identified in FIGURE 3 as bracket 23 supporting the photo-cathode end of the image tube 13, and two substantially equally spaced brackets 24 and 25 supporting the central portion of the image tube. A fourth bracket 26 supports the photo-anode end 15 of the image tube 13. Brackets 23, 24, 25 and 26 provide the dual functions of supporting the image tube 13 and forming the main body of the complete image converter camera 13, thereby providing the main bearing members for supporting the chassis 19. The width of brackets 24 and 25 is less than that of brackets 23 and 26. A magnetic shield 27 is formed to substantially encircle the image converter tube 13 to thereby prevent stray light and stray magnetic fields from affecting the tube. The shield 27 is located substantially on the periphery of support members 24 and 25 which thereby define the peripheral shape taken by the magnetic shield 27. The uppermost portion of the shield 27 is attached to a feed-through connector 28 adapted to receive wiring connections from the electronic chassis 19. The removable electronic chassis 19 is located symmetrically above the image tube 13 and consists of a pair of sub-chassis 29 and 30. Each sub-chassis 29 and 30 has the necessary tube sockets 31 for supporting a plurality of the electron discharge devices 32 in a horizontal position. The leads 33 from tube sockets 31 are directly connected to a connector 34 attached to chassis 19 and which is adapted to mate with a female connector located in bracket 25 which connects the terminating ends of the shield 27. The individual terminals are therefore available for test purposes and the leads are kept as short as possible, which is necessary for the correct operation of the unit. The chassis 19 also contains a plurality of openings 35 located substantially below the horizontally disposed electron discharge devices 32. The outside cover 20 is formed over support members 23 and 26.

In the illustrated embodiment the upper portion of the cover 20 is separate from the lower portion of the cover and attached to the chassis 19, thereby making the chassis and upper cover removable as a unit. In operation the heat developed by the electron discharge devices 32 causes a circulating convection current to flow through the louvers 21, through the narrow passageway defined by cover 20 and the magnetic shield 27, through the openings 35 in the chassis 19 and out the ventilating openings 22 in the uppermost portion of the cover. In this fashion cooling is achieved without the need of mechanically rotating devices while at the same time the individual leads from the electronic chassis 19 are maintained as short as possible.

This completes the description of the embodiment of the invention illustrated herein. However, many modifications and advantages thereof will be apparent to persons skilled in the art without departing from the spirit and scope of this invention. Accordingly, it is desired that this invention not be limited to the particular details of the embodiment disclosed herein, except as defined by the appended claims.

The embodiments of the invention in which an exclusive property or privilege is claimed are defined as follows:

1. An image converter tube sensitive to magnetic field variations and adapted to provide means for observing high speed phenomenon, an interchangeable electronic chassis juxtapositioned vertically above said image converter tube and located thereon for maintaining interconnecting leads as short as possible, said chassis containing a sub-chassis adapted to support a plurality of electron discharge devices in a horizontal plane over said image converter tube, said chassis having openings substantially below said electron discharge tubes for allowing convection cooling currents to pass from under said chassis up to and around said electron discharge devices, a magnetic shielding material surrounding said image converter tube, and a cover having louvers on the lowermost portion and ventilating openings on the uppermost portion thereon, said cover and said magnetic shielding material being in close relationship to define a passageway for circulating convection currents of air from said louvers through said opening in said chassis and out said ventilating openings whereby said electron discharge devices are cooled without utilizing mechanical means.

2. An image converter tube sensitive to magnetic field variations and adapted to provide means for observing high speed phenomenon, an interchangeable electronic chassis juxtapositioned vertically above said image converter tube and located thereon for maintaining interconnecting leads as short as possible, said chassis containing a pair of sub-chassis adapted to support a plurality of electron discharge devices in a horizontal plane over different halves of said image converter tube, said chassis having openings substantially below said electron discharge tubes for allowing convection cooling currents to pass from under said chassis up to and around said electron discharge devices, a magnetic shielding material surrounding said image converter tube, and a cover having louvers on the lowermost portion and ventilating openings on the uppermost portion thereon, said cover and said magnetic shielding material being in close relationship to define a passageway for circulating convection currents of air from said louvers through said opening in said chassis and out said ventilating openings whereby said electron discharge devices are cooled without utilizing mechanical means.

3. An image converter tube sensitive to magnetic field variations and adapted to provide means for observing high speed phenomenon, an interchangeable electronic chassis juxtapositioned vertically above said image converter tube and symmetrically located thereon for maintaining interconnecting leads as short as possible, said chassis containing a sub-chassis adapted to support a plurality of electron discharge devices in a horizontal plane over different halves of said image converter tube, said chassis having openings substantially below said electron discharge tubes for allowing convection cooling currents to pass from under said chassis up to and around said electron discharge devices, a magnetic shielding material surrounding said image converter tube, and a cover having louvers on the lowermost portion and ventilating openings on the uppermost portion thereon, said cover and said magnetic shielding material being in close relationship to define a passageway for circulatiag convection currents of air from said louvers through said opening in said chassis and out said ventilating openings whereby said electron discharge devices are cooled without utilizing mechanical means.

4. An image converter tube sensitive to magnetic field variations and adapted to provide means for observing high speed phenomenon, an interchangeable electronic chassis juxtapositioned vertically above said image converter tube and symmetrically located thereon for maintaining interconnecting leads as short as possible, said chassis containing a pair of sub-chassis adapted to support a plurality of electron discharge devices in a horizontal plane over different halves of said image converter tube, said chassis having openings substantially below said electron discharge tubes for allowing convection cooling currents to pass from under said chassis up to and around said electron discharge devices, a magnetic shielding material surrounding said image converter tube, and a cover having louvers on the lowermost portion and ventilating openings on the uppermost portion thereon, said cover and said magnetic shielding material being in close relationship to define a passageway for circulating convection currents of air from said louvers through said openings in said chassis and out said ventilating openings whereby said electron discharge devices are cooled without utilizing mechanical means.

5. An image converter tube sensitive to magnetic field variations and adapted to provide means for observing high speed phenomenon, an interchangeable electronic chassis juxtapositioned vertically above said image converter tube and located thereon for maintaining interconnecting leads as short as possible, said chassis containing a sub-chassis adapted to support a plurality of electron discharge devices in a horizontal plane over different halves of said image converter tube, said chassis having openings substantially below said electron discharge tubes for allowing convection cooling currents to pass from under said chassis up to and around said electron discharge devices, a magnetic shielding material surrounding said image converter tube, and a cover having louvers on the lowermost portion and ventilating openings on the uppermost portion thereon, said cover and said magnetic shielding material being in close relationship to define a passageway having a chimney effect for circulating convection currents of air from said louvers through said opening in said chassis and out said ventilating openings whereby said electron discharge devices are cooled without utilizing mechanical means, said defined passageway being substantially narrow with respect to the length for enhancing said chimney effect of said passageway.

6. An image converter tube sensitive to magnetic field variations and adapted to provide means for observing high speed phenomenon, an interchangeable electronic chassis juxtapositioned vertically above said image converter tube and located thereon for maintaining interconnecting leads as short as possible, said chassis containing a sub-chassis adapted to support a plurality of electron discharge devices in a horizontal plane over different halves of said image converter tube, said chassis having openings substantially below said electron discharge tubes for allowing convection cooling currents to pass from under said chassis up to and around said electron discharge devices, a magnetic shielding material surrounding said image converter tube, a lower ornamental cover covering the magnetic shielding material and having louvers on the lowermost portion, a top ornamental cover attached to said electronic chassis and having ventilating openings on the uppermost portion, said lower cover and said magnetic shielding material being in close relationship to define a passageway for circulating convection currents of air from said louvers through said openings in said chassis and out said ventilating openings whereby said electron discharge devices are cooled without utilizing mechanical means.

7. An image converter tube sensitive to magnetic field variations and adapted to provide means for observing high speed phenomenon, an interchangeable electronic chassis juxtapositioned vertically above said image converter tube and located thereon for maintaining interconnecting leads as short as possible, said chassis containing a sub-chassis adapted to support a plurality of electron discharge devices in a horizontal plane over different halves of said image converter tube, said chassis having openings substantially below said electron discharge tubes for allowing convection cooling currents to pass from under said chassis up to and around said electron discharge devices, a magnetic shielding material surrounding said image converter tube, a lower ornamental cover covering the magnetic shielding material and having louvers on the lowermost portion, a top ornamental cover attached to said electronic chassis and having ventilating openings on the uppermost portion, said electronic chassis and said top ornamental cover forming a complete entity and adapted to be removed as a unit, said lower cover and said magnetic shielding material being in close relationship to define a passageway for circulating convection currents of air from said louvers through said openings in said chassis and out said ventilating openings whereby said electron discharge devices are cooled without utilizing mechanical means.

8. An image converter tube sensitive to magnetic field variations and adapted to provide means for observing high speed phenomenon, an interchangeable electronic chassis juxtapositioned vertically above said image converter tube and symmetrically located thereon for maintaining interconnecting leads as short as possible, said chassis containing a pair of sub-chassis adapted to support a plurality of electron discharge devices in a horizontal plane over different halves of said image converter tube, said chassis having openings substantially below said electron discharge tubes for allowing convection cooling currents to pass from under said chassis up to and around said electron discharge devices, a magnetic shielding material surrounding said image converter tube, a lower ornamental cover covering the magnetic shielding material and having louvers on the lowermost portion, a top ornamental cover attached to said electronic chassis and having ventilating openings on the uppermost portion, said electronic chassis and said top ornamental covering forming a complete entity and adapted to be removed as a unit, said lower cover and said magnetic shielding material being in close relationship to define a passageway for circulating convection currents of air from said louvers through said openings in said chassis and out said ventilating openings whereby said electron discharge devices are cooled without utilizing mechanical means.

References Cited by the Examiner

UNITED STATES PATENTS

| | | | |
|---|---|---|---|
| 1,537,228 | 5/25 | Gargon | 317—100 |
| 2,798,897 | 7/57 | Bang | 317—101 |
| 2,897,487 | 7/59 | Owen | 174—16 |
| 2,898,585 | 8/59 | Bauman | 317—101 |

JOHN F. BURNS, *Primary Examiner.*